United States Patent
Kornilovich et al.

(10) Patent No.: US 11,097,270 B2
(45) Date of Patent: Aug. 24, 2021

(54) MICROFLUIDIC FILTERING SYSTEM

(71) Applicant: HEWLETT-PACKARD DEVELOPMENT COMPANY, L.P., Houston, TX (US)

(72) Inventors: Pavel Kornilovich, Corvallis, OR (US); Alexander Govyadinov, Corvallis, OR (US); David P. Markel, Corvallis, OR (US); Erik D. Torniainen, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 372 days.

(21) Appl. No.: 16/300,115

(22) PCT Filed: Jul. 15, 2016

(86) PCT No.: PCT/US2016/042530
§ 371 (c)(1),
(2) Date: Nov. 9, 2018

(87) PCT Pub. No.: WO2018/013135
PCT Pub. Date: Jan. 18, 2018

(65) Prior Publication Data
US 2019/0143327 A1    May 16, 2019

(51) Int. Cl.
*B01L 3/00* (2006.01)
*B01D 35/26* (2006.01)
*B01D 29/00* (2006.01)

(52) U.S. Cl.
CPC ........ *B01L 3/502753* (2013.01); *B01D 35/26* (2013.01); *B01L 3/50273* (2013.01);
(Continued)

(58) Field of Classification Search
CPC ..... G01N 33/48; B81B 1/00; B01L 3/502753; B01L 3/50273; B01L 3/502761;
(Continued)

(56) References Cited

U.S. PATENT DOCUMENTS

| 5,855,782 A | 1/1999 | Falkenhagen et al. |
| 6,142,601 A | 11/2000 | Sharma et al. |

(Continued)

FOREIGN PATENT DOCUMENTS

| EP | 1457251 A1 | 9/2004 |
| EP | 2907565 A1 | 8/2015 |

(Continued)

OTHER PUBLICATIONS

Glasgow, Ian et al. "Enhancement of microfluidic mixing using time pulsing." Lab on a Chip, vol. 3, No. 2 (2003), Harvard, pp. 114-120.
(Continued)

*Primary Examiner* — Jennifer Wecker
*Assistant Examiner* — Kathryn Elizabeth Limbaugh
(74) *Attorney, Agent, or Firm* — Perry + Currier Inc

(57) ABSTRACT

A microfluidic filtering system may include a first microfluidic channel, a first pump to move fluid along the first microfluidic channel in a first direction, a second microfluidic channel, a second pump to move fluid along the second microfluidic channel in a second direction opposite to the first direction and a filter channel extending between and interconnecting the first microfluidic channel and the second microfluidic channel.

14 Claims, 5 Drawing Sheets

(52) U.S. Cl.
CPC ........ *B01L 3/502746* (2013.01); *B01D 29/00* (2013.01); *B01L 3/502761* (2013.01); *B01L 2200/0631* (2013.01); *B01L 2300/0681* (2013.01); *B01L 2300/0816* (2013.01); *B01L 2400/0442* (2013.01); *B01L 2400/086* (2013.01)

(58) Field of Classification Search
CPC ....... B01L 3/502746; B01L 2200/0631; B01L 2300/0816; B01L 2300/0681; B01L 2400/0442; B01L 2400/086; B01D 35/26; B01D 29/00
See application file for complete search history.

(56) References Cited

U.S. PATENT DOCUMENTS

| | | | |
|---|---|---|---|
| 6,283,575 | B1 | 9/2001 | Hawkins et al. |
| 6,513,903 | B2 | 2/2003 | Sharma et al. |
| 6,572,215 | B2 | 6/2003 | Sharma |
| 6,595,617 | B2 | 7/2003 | Sharma et al. |
| 2004/0256318 | A1* | 12/2004 | Iida .................... B01D 67/0034 210/634 |
| 2007/0160474 | A1 | 7/2007 | Iida |
| 2010/0012586 | A1 | 1/2010 | Angelescu et al. |
| 2010/0051124 | A1* | 3/2010 | Imran ................. B01L 3/50273 137/565.11 |
| 2011/0286493 | A1* | 11/2011 | Torniainen .............. F04B 17/00 374/33 |
| 2012/0149021 | A1 | 6/2012 | Yung et al. |
| 2015/0328637 | A1 | 11/2015 | Perrault, Jr. et al. |

FOREIGN PATENT DOCUMENTS

| | | |
|---|---|---|
| WO | WO-2011079217 A1 | 6/2011 |
| WO | WO-2014178827 | 11/2014 |
| WO | WO-2016016825 A1 | 2/2016 |

OTHER PUBLICATIONS

Goullet, Arnaud et al. "Dynamics of microfluidic mixing using time pulsing." Discrete Cont. Dyn. Syst., Suppl (2005), pp. 327-336.

Orsi, Gianni, et al. "Water-ethanol mixing in T-shaped microdevices." Chemical Engineering Science 95 (2013). pp. 174-183.

* cited by examiner

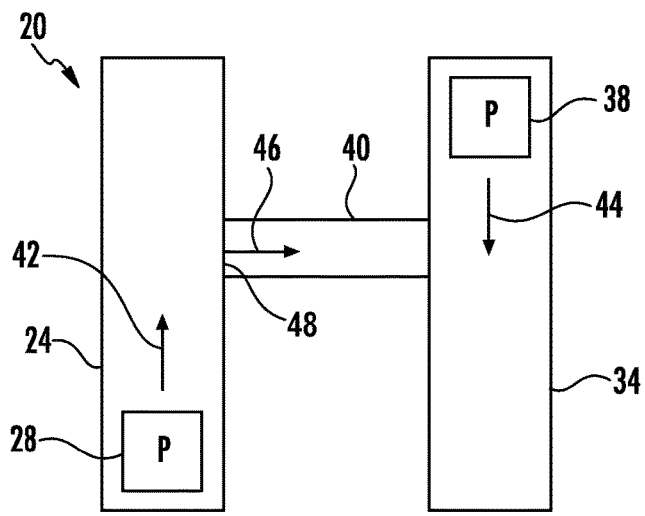
FIG. 1
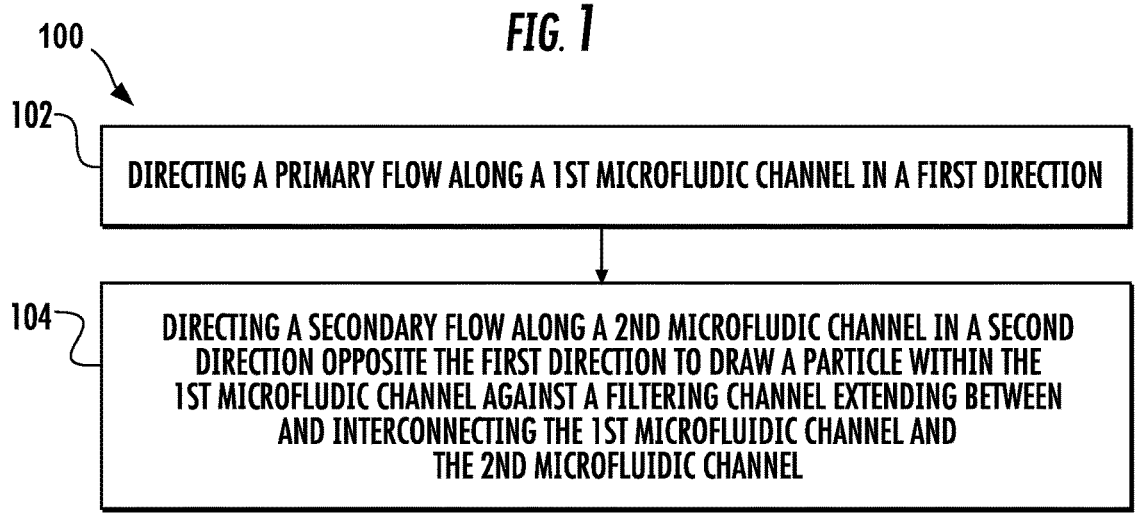
FIG. 2
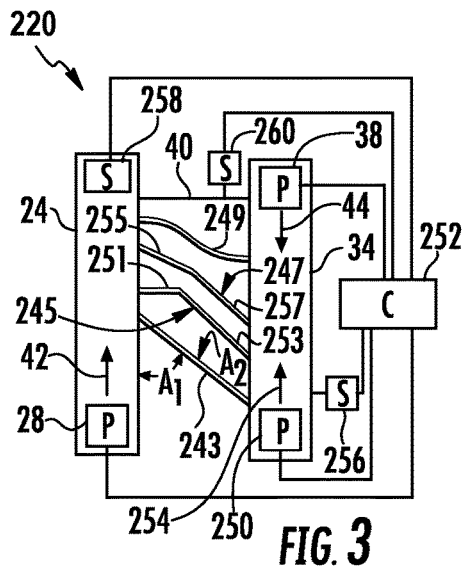
FIG. 3
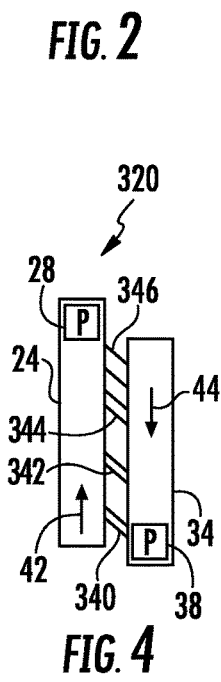
FIG. 4
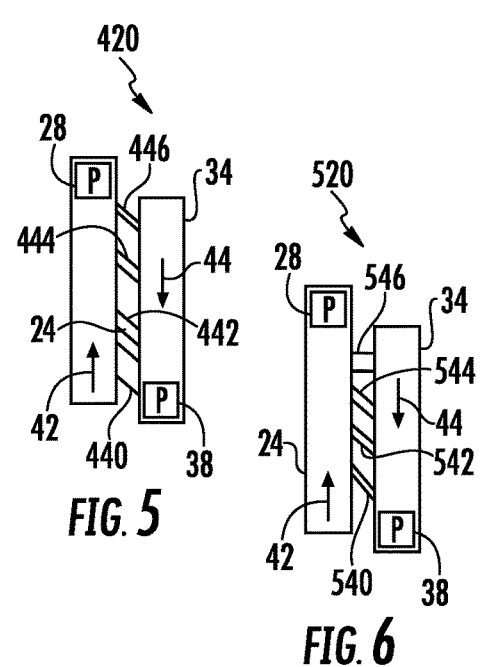
FIG. 5
FIG. 6

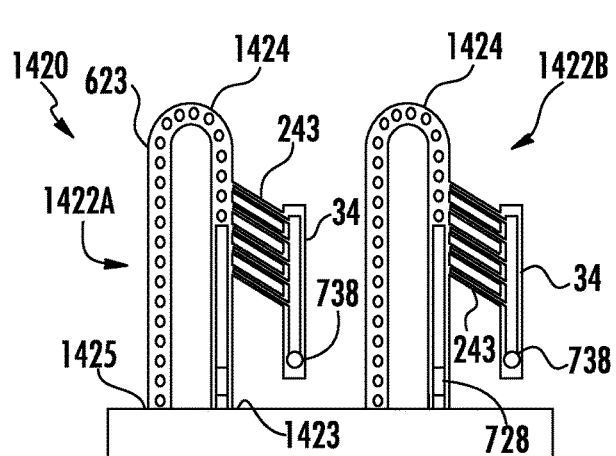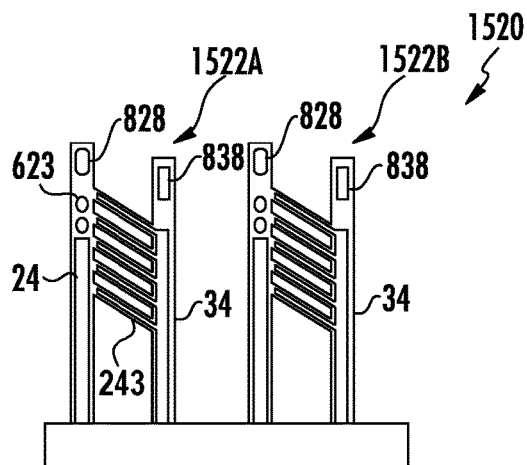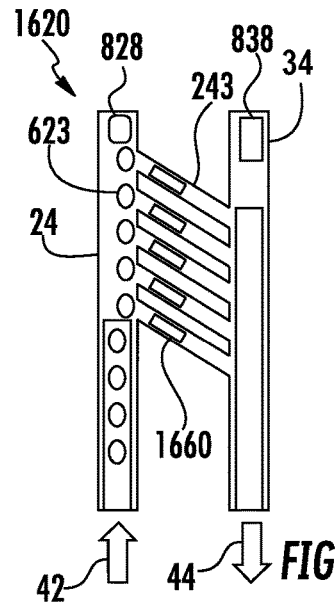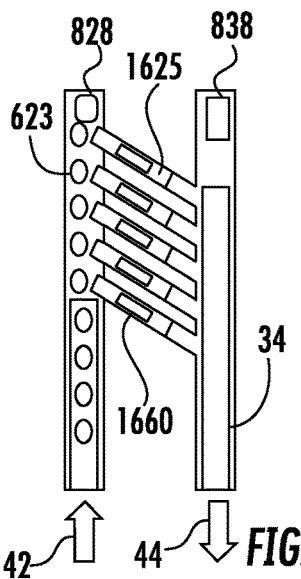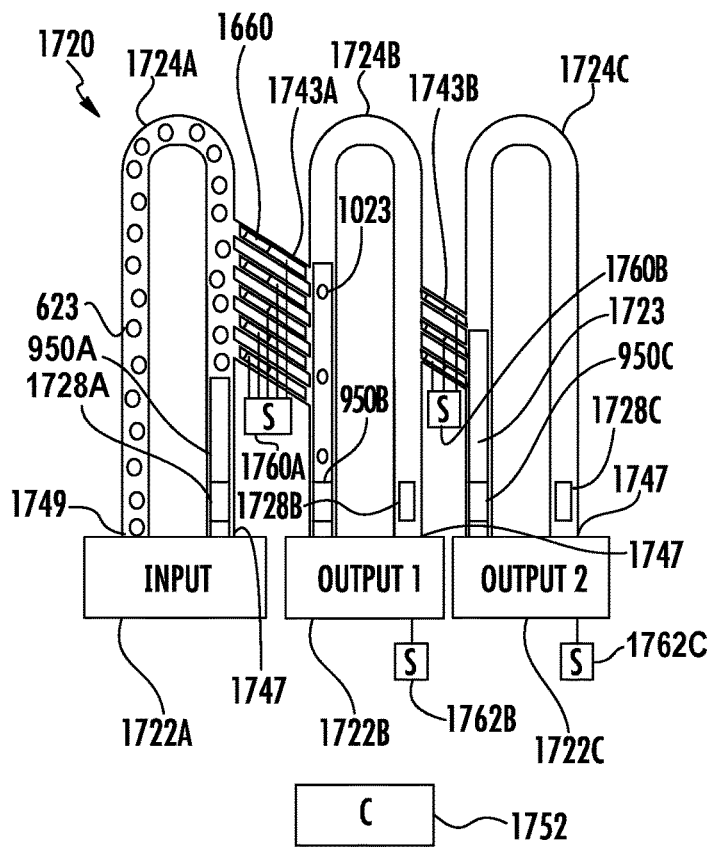

MICROFLUIDIC FILTERING SYSTEM

BACKGROUND

Fluids often contain contaminants that are to be removed or separated out. In many circumstances, the contaminants are removed or separated out using filters. Existing filters may be difficult to employ in microfluidic applications.

BRIEF DESCRIPTION OF THE DRAWINGS

FIG. 1 is a schematic diagram of an example microfluidic filtering system.

FIG. 2 is a flow diagram of an example method for filtering a fluid.

FIG. 3 is a schematic diagram of an example microfluidic filtering system.

FIG. 4 is a schematic diagram of an example microfluidic filtering system.

FIG. 5 is a schematic diagram of an example microfluidic filtering system.

FIG. 6 is a schematic diagram of an example microfluidic filtering system.

10 is a schematic diagram of an example microfluidic filtering system.

Figure 11:
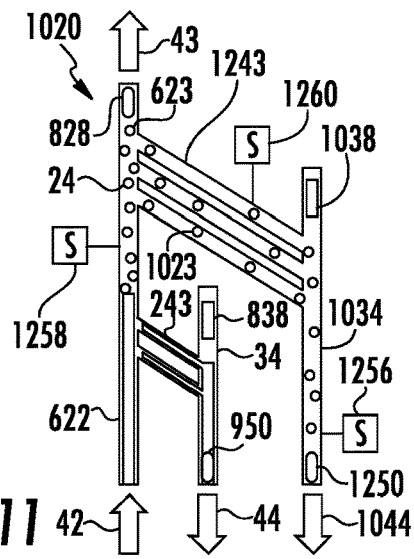

FIG. 11 is a schematic diagram of an example microfluidic filtering system.

Figure 12:
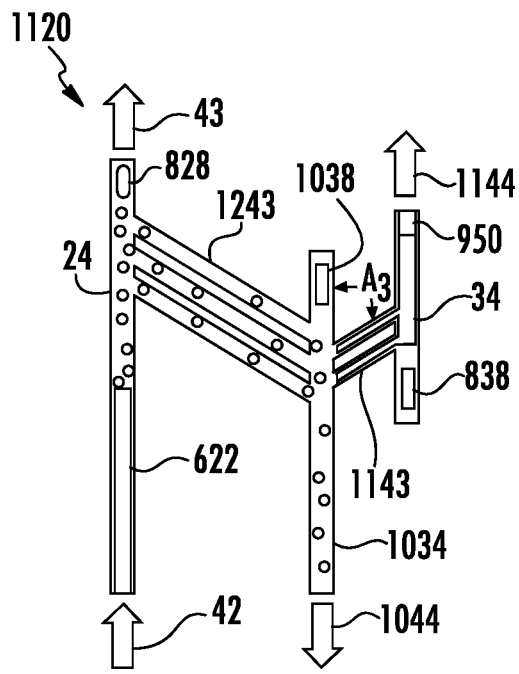

FIG. 12 is a schematic diagram of an example microfluidic filtering system.

Figure 13:
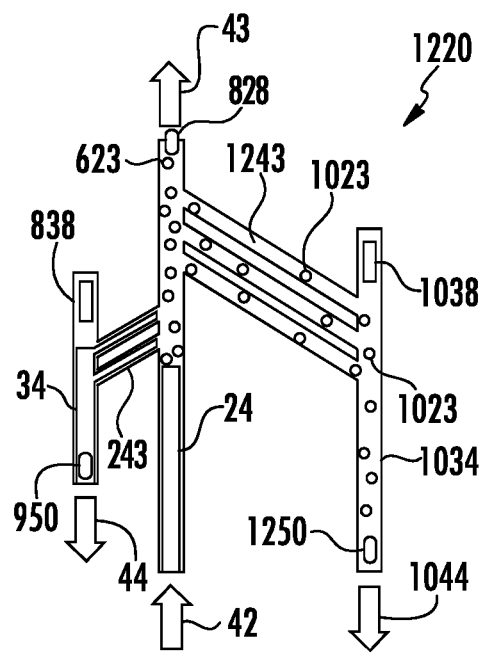

FIG. 13 is a schematic diagram of an example microfluidic filtering system.

Figure 14:
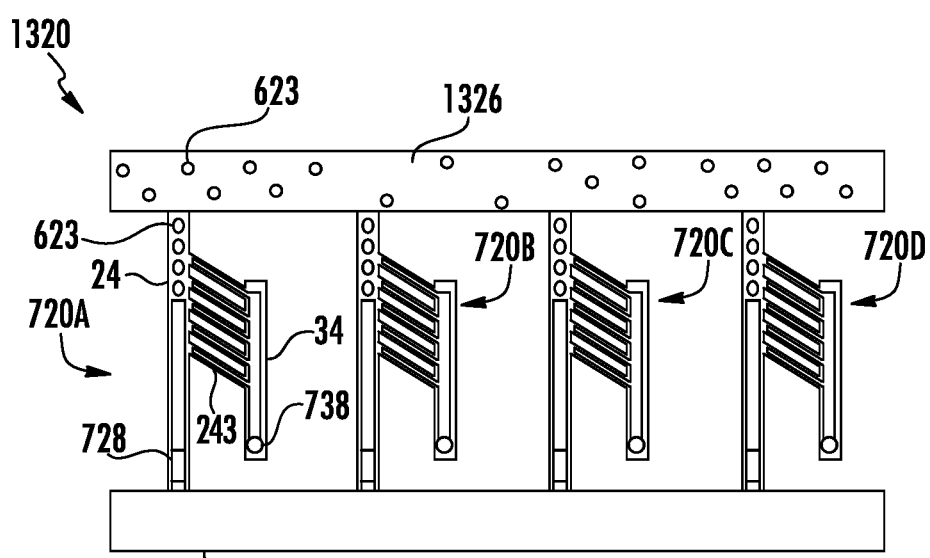

FIG. 14 is a schematic diagram of an example microfluidic filtering system.

FIG. 15 is a schematic diagram of an example microfluidic filtering system.

FIG. 16 is a schematic diagram of an example microfluidic filtering system.

FIG. 17A is a schematic diagram of an example microfluidic filtering system,

FIG. 17B is a schematic diagram of the microfluidic filtering system of FIG. 17A illustrating cleaning of filtering channels.

FIG. 18 is a schematic diagram of an example microfluidic filtering system.

Figure 19:
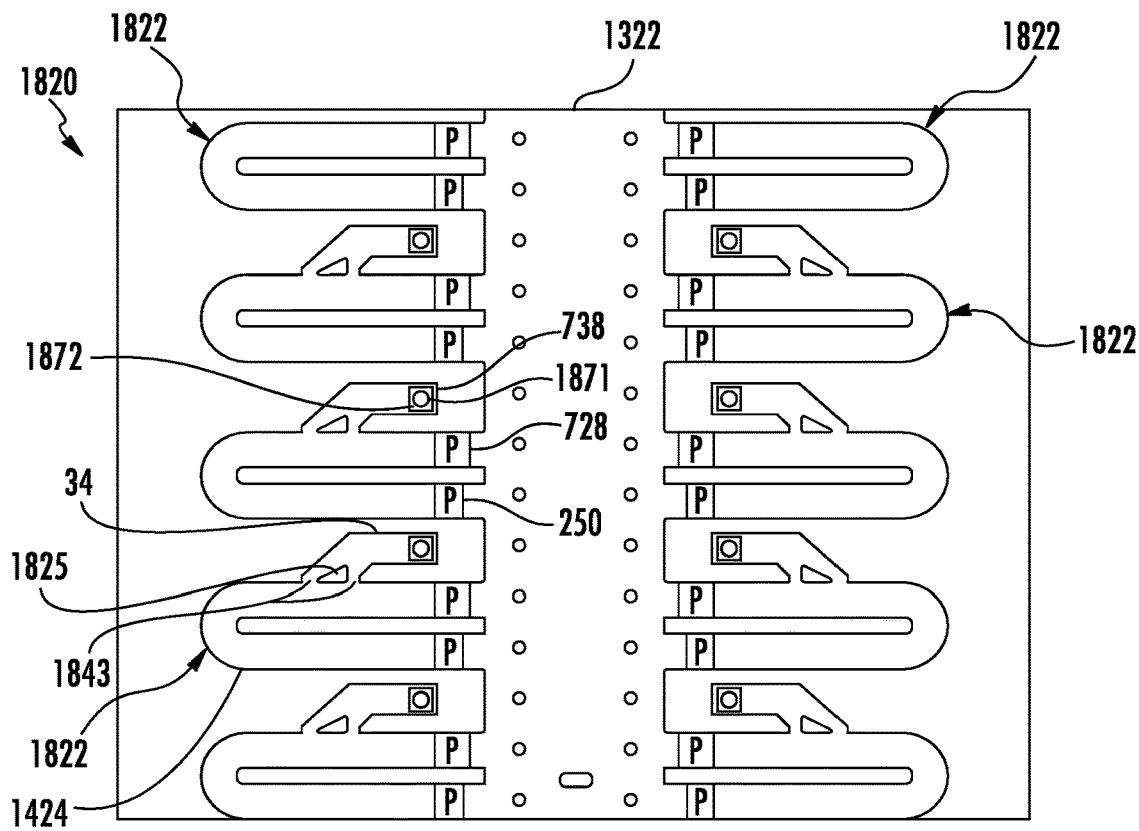

FIG. 19 is a top view schematically illustrating an example microfluidic filtering system.

Figure 20:
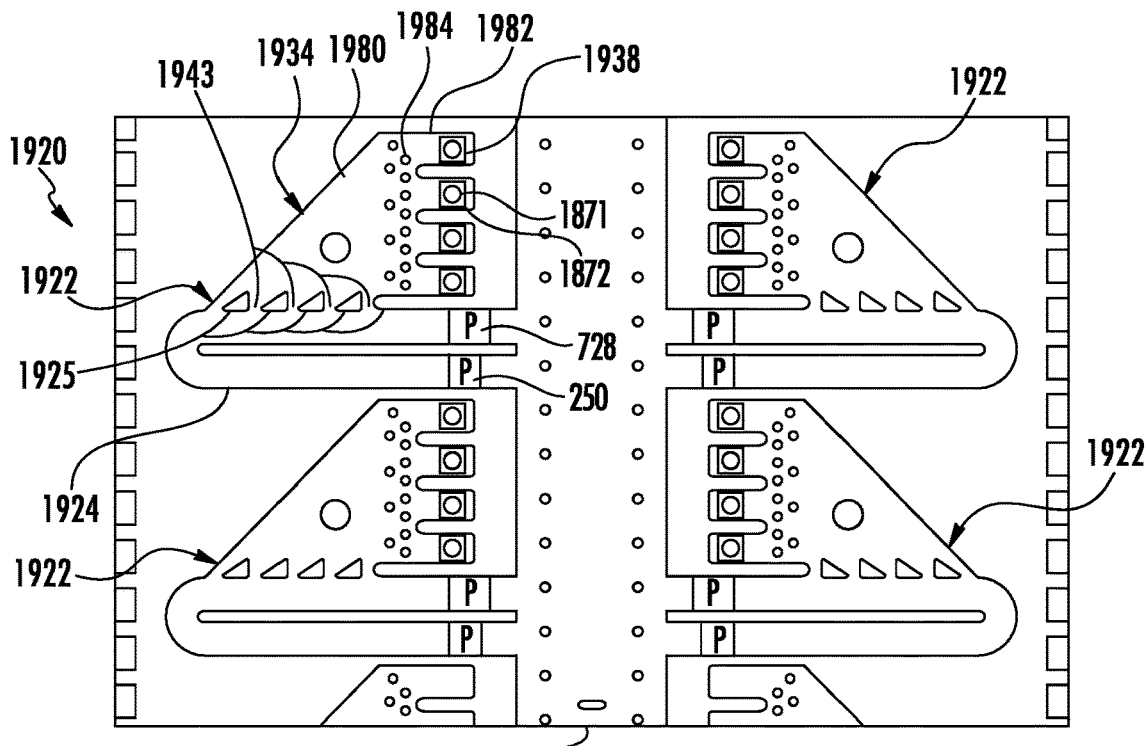

FIG. 20 is a top view schematically illustrating an example microfluidic filtering system.

DETAILED DESCRIPTION OF EXAMPLES

One example of the present disclosure describes a microfluidic filtering system that facilitates filter cleaning using a counter-flow of fluid. The microfluidic filtering system filters fluid flowing in a first direction within a first microfluidic channel with a filtering channel connected to a second microfluidic channel, wherein fluid in the second microfluidic channel fluid is pumped in a second direction opposite to the first direction. In one implementation, the pumping of fluid in the second microfluidic channel is pulsed to facilitate cleaning of the filtering channel. In one implementation, the fluid within the second microplate channel is pumped in the first direction to facilitate cleaning of the filtering channel.

FIG. 1 schematically illustrates an example microfluidic filtering system 20. Filtering system 20 comprises microfluidic channel 24, pump 28, microfluidic channel 34, pump 38 and filter channel 40. Microfluidic channel 24, a portion of which is shown, comprise a passage or conduit along which the primary flow of fluid is guided. In one implementation, channel 24 guides the flow of a sample containing differently sized particles or differently sized chemical or biological elements. For purposes of this disclosure, the term "microfluidic" refers to volumes containing fluids or through such fluid flow, wherein such volumes have at least one dimension of one millimeter and below. In one implementation, has a dimension of at least two times and up to 10 times the size of the particles being transmitted in the fluid flow and being filtered by filter channel 40.

Although microfluidic channel 24 is illustrated in FIG. 1 as being linear and is having a uniform cross-sectional area along its length, in other implementations, microfluidic channel 24 may have a variety of sizes and shapes. For example, in other implementations, microfluidic channel 24 may have a variety of different cross-sectional shapes. In other implementations, microfluidic channel 24 may have a varying cross-sectional size and/or cross sectional shape along its length. In other implementations, microfluidic channel 24 may extend along a nonlinear path, such as a polygonal path, a curved path or serpentine path.

Pump 28 comprises a device to apply force to and move fluid along channel 24 in the first direction indicated by arrow 42. Examples of pump 28 include, but are not limited to, a piezoelectric membrane, a thermal bubble resistor pump, and electrostatic micro-electro-mechanical system (MEMS) membrane, a mechanical/impact driven membrane, a voice coil pump, a magnetostrictive drive pump and a fluid ejector. With a fluid ejector, fluid is ejected from channel 24 to create capillary pressure that draws fluid in the direction indicated by arrow 42. Examples of such a fluid ejector include, but are not limited to, a bubble jet resistor that ejects fluid through a nozzle. In one implementation, pump 28 may comprise an inertial pump, wherein the pump 28 is asymmetrically located along the length of channel 24, spaced from ends of channel 24 by different distances, such that pump 28 propagates oppositely directed waves and produces a unidirectional net fluid flow in the direction indicated by arrow 42. In one implementation, pump 28 may be provided at either end of microfluidic channel 24, within channel 24 or beyond the ends of channel 24. In one implementation, pump 28 may push fluid within channel 24 in the direction indicated by arrow 42 across filter channel 40. In another implementation, pump 28 may draw fluid within channel 24 in the direction indicated by arrow 42 across filter channel 40.

Microfluidic channel 34 cooperates with filter channel 40 to filter particles away from or out of the primary flow of fluid within channel 24. Microfluidic channel 34, a portion of which is shown, comprises a passage or conduit along which a secondary counter flow of fluid is guided.

Although microfluidic channel 34 is illustrated as being linear, parallel to channel 24 and as having a uniform cross-sectional area along its length, in other implementations, microfluidic channel 34 may have a variety of different sizes, shapes and paths. For example, in other implementations, microfluidic channel 34 may have a variety of different cross-sectional shapes. In other implementations, microfluidic channel 34 may have a varying cross-sectional size and/or cross sectional shape along its length. In other implementations, microfluidic channel 34 may extend along a nonlinear path, such as a polygonal path, a curved path or serpentine path. In other implementations, microfluidic channel 34 may extend nonparallel to or oblique to channel 24.

Pump 38 is similar to pump 28. Pump 38 comprises a device to apply force to and move fluid along channel 34 in the first direction as indicated by arrow 44. Examples of pump 38 include, but are not limited to, a piezoelectric membrane, a thermal bubble resistor pump, and electrostatic micro-electro-mechanical system (MEMS) membrane, a mechanical/impact driven membrane, a voice coil pump, a magnetostrictive drive pump and a fluid ejector. With a fluid ejector, fluid is ejected from channel 34 to create capillary pressure that draws fluid in the direction indicated by arrow 44. One example of such a fluid ejector is a bubble jet resistor that ejects fluid through a nozzle. In one implementation, pump 28 may comprise an inertial pump, wherein the pump 38 is asymmetrically located along the length of channel 34, spaced from ends of channel 34 by different distances, such that pump 38 propagates oppositely directed waves and produces a unidirectional net fluid flow in the direction indicated by arrow 44. In one implementation, pump 38 may be provided at either end of microfluidic channel 34, within channel 34 or beyond the ends of channel 34. In one implementation, pump 38 may push fluid within channel 34 in the direction indicated by arrow 44 across filter channel 40. In another implementation, pump 38 may draw fluid within channel 34 in the direction indicated by arrow 44 across filter channel 40.

Filter channel 40 comprises a microfluidic passage extending between and interconnecting microfluidic channel 24 and microfluidic channel 34. Filter channel 40 is dimensioned and/or shaped with a size or cross-sectional area so as to impede or block the flow of selected particles or elements having at least one dimensional size greater than a predetermined dimensional size. In one implementation, filter channel 40 has a cross-sectional area of less than or equal to at least 5 μm and up to 10 μm so as to filter or block the passage of particles or elements having greater dimensions. In one implementation, microfluidic channels 34 and 24 can have a dimension of hundreds of microns in cross-sectional while filtering channels 40 have a dimension in cross-section with a micron or tens of microns scale.

In one implementation, filter channel 40 connects to microfluidic channel 24, wherein intersecting centerlines of channels 24 and 40 are perpendicular or such that the intersecting centerlines of channels 24 and 40 form an acute angle facing in upstream and of microfluidic channel 24, opposite to the direction indicated by arrow 42. As a result, larger particles may be moved away from filter channel 40 so as to clean or unclog filter channel 40. In one implementation, filter channel 40 connects to microfluidic channel 34 such that the intersecting centerlines of channels 34 and 40 are perpendicular or such that the intersecting centerlines of channels 34 and 40 form an acute angle facing the upstream end of microfluidic channel 34, opposite to the direction indicated arrow 44. As a result, the fluid being moved within channel 34 is less likely to flow into filter channel 40 and into microfluidic channel 24.

FIG. 2 is a flow diagram of an example method 100 for filtering a primary flow of fluid. Although method 100 is described as being carried out by microfluidic filtering system 20 described above, it should be understood that method 100 may be carried out by any of the microfluidic filtering systems described hereafter.

As indicated by block 102, a primary flow of fluid is directed along a first microfluidic channel, microfluidic channel 24, in the first direction, indicated by arrow 42 in FIG. 1. In one implementation, the primary flow in the first direction is facilitated by action of pump 28. In one implementation, the primary flow may be pushed in the direction indicated by arrow 42. In another implementation, the primary flow may be drawn in the direction indicated by arrow 42. In one implementation, the pump 28 may move the fluid by ejecting a volume of fluid from channel 24, wherein capillary pressure draws fluid in the direction indicated by arrow 42.

As indicated by block 104, a secondary flow of fluid along a second microfluidic channel (microfluidic channel 34) and a second direction opposite the first direction (as indicated by arrow 44) is created or directed so as to draw the fluid being filtered into channel 34. During such filtering, particles within the first microfluidic channel 24 and larger than the dimensions of filter channel 40 may be drawn against filter channel 40 so as to clog or occlude filter channel 40. In the example shown in FIG. 1, larger particles are drawn in the direction indicated by arrow 46 and are retained against the mouth or inlet 48 of filter channel 40. In one implementation, the inlet 48 may comprise a single opening that is sized and/or shaped to block the passage of the larger particles out of channel 24. In another implementation, inlet 48 may comprise multiple smaller passages, each of the multiple smaller passages being sized and/or shaped to block the passage of the larger particles out of channel 24.

In one implementation, the secondary flow is constant. In another implementation, the secondary flow is intermittent or pulsed. During such times that the secondary flow is slowed or paused, the larger particles that may be clogging filter particle 40 are released and are driven downstream to clean the entrance of filter channel 40 long channel 24. The end result is that the larger particles experience back and forth motion, repeatedly or constantly clogging and unclogging filter channel 40.

In one implementation, method 100 may be utilized to filter a sample. For example, if whole blood is to be cleaned of red blood cells to obtain and analyze blood plasma, method 100 may be utilized to direct the flow of the clean sample (plasma) through filter channel 40 to the secondary flow within channel 34, wherein the primary flow within channel 24 outputs the "waste" (red blood cells). However, in other processes, such as a DNA extraction process, large particles may comprise silica beads with absorbed DNA molecules of interest. In such an implementation, the primary flow within channel 24 may contain the absorbed DNA molecules of interest while the secondary flow within channel 24 may include the rest of the lysed cells (proteins, lipids and the like) which have passed through filter channel 40.

FIG. 3 schematically illustrates an example microfluidic filtering system 220. System 220 is similar to system 20 described above except that system 220 is illustrated as additionally comprising various example filter channels 243, 245, 247 and 249, pump 250 and controller 252. Those remaining components or elements of system 220 which correspond to components or elements of system 20 are numbered similarly.

Like filter channel 40, filter channels 243, 245, 247 and 249 each comprises a microfluidic passage extending between and interconnecting microfluidic channel 24 and microfluidic channel 34. Each of such filter channels 243, 245, 247 and 249 is dimensioned and/or shaped so as to impede or block the flow of selected particles or elements having at least one dimensional size greater than a predetermined dimensional size. Each of such filter channels 243, 245, 247 and 249 has a cross-sectional area less than that of the cross-sectional area of microfluidic channel 24. Although system 220 is illustrated as including filter channel 40 as well as each of filter channels 243, 245, 247 and 249, in other implementations, system 20 may comprise less than all of those channels being shown. In some implementations, system 220 may include multiple filter channels extending between channels 24 and 34, wherein each of the multiple filter channels has the same shape or configuration.

In the example illustrated, filter channel 243 linearly extends between channels 24 and 34 at an angle oblique to each of channels 24 and 34. Channel 24 and filter channel 243 have intersecting centerlines that form an acute angle A1 facing the upstream end of microfluidic channel 24. Channel 34 and filter channel 243 have intersecting centerlines that form an acute angle A2 facing the upstream end of microfluidic channel 34 (opposite to the direction of arrow 44).

Filter channel 245 comprises a multi-segmented filtering channel. Filter channel 245 has a first segment 251 extending perpendicular from microfluidic passage 24 and a second segment 253 that is oblique to microfluidic passage 34, forming an acute angle facing the upstream end of microfluidic channel 34. Filter channel 247 comprises a multi-segmented filtering channel having a first segment 255 that is oblique to microfluidic channel 24 and a second segment 257 that is also oblique to microfluidic channel 34, wherein segments 255 and 257 extended different angles relative to channels 24 and 34, respectively.

Filter channel 249 comprises a serpentine filtering channel extending between channels 24 and 34. Although each of channels 243, 245, 247 and 249 illustrated as having the illustrated sizes, shapes and angles, in other implementations, each of channels 243, 245, 247 249 may have other sizes, shapes and angles while maintaining the same overall general configuration.

Pump 250 comprises a device to move fluid in channel 34 in a direction opposite to pump 38, in the direction indicated by arrow 254. In the example illustrated, pump 250, when activated, moves fluid in the direction of arrow 254. Pump 250 may be selectively activated to more forcefully clean filter channels 40, 243, 245, 247 and 249 by creating a reverse fluid flow from channel 34 through such filter channels into channel 24 to disengage such larger particles that may be entrapped against the inlet of such filter channels. Pump 250 may be activated when movement of fluid by pump 38 is paused or ceased.

Examples of pump 250 include, but are not limited to, a piezoelectric membrane, a thermal bubble resistor pump, and electrostatic micro-electro-mechanical system (MEMS) membrane, a mechanical/impact driven membrane, a voice coil pump, a magnetostrictive drive pump and a fluid ejector. With a fluid ejector, fluid is ejected from channel 34 to create capillary pressure that draws fluid in the direction indicated by arrow 254. Examples of such a fluid ejector include, but are not limited to, a bubble jet resistor that ejects fluid through a nozzle. In one implementation, pump 250 may comprise an inertial pump, wherein the pump 250 is asymmetrically located along the length of channel 34, spaced from ends of channel 34 by different distances, such that pump 250 propagates oppositely directed waves and produces a unidirectional net fluid flow in the direction indicated by arrow 254. In one implementation, pump 250 may be provided at either end of microfluidic channel 34, within channel 34 or beyond the ends of channel 34. In one implementation, pump 38 may push fluid within channel 34 in the direction indicated by arrow 254 past filter channel 40. In another implementation, pump 250 may draw fluid within channel 34 in the direction indicated by arrow 44 past filter channel 40.

Controller 252 comprises a processing unit that follows computer-readable instructions or programming so as to control the activation of pumps 28, 38 and 250. For purposes of this application, the term "processing unit" shall mean a presently developed or future developed computing hardware that executes sequences of instructions contained in a non-transitory computer-readable medium or memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage, In other embodiments, hard wired circuitry may be used in place of or in combination with software instructions to implement the functions described. For example, controller 252 may be embodied as part of one or more application-specific integrated circuits (ASICs). Unless otherwise specifically noted, the controller is not limited to any specific combination of hardware circuitry and software, nor to any particular source for the instructions executed by the processing unit.

In one implementation, controller 252 outputs control signals causing the pumping action or operation of pump 38 to be intermittent or pulsed, facilitating back and forth motion of any particular elements occluding or clogging the filter channels to potentially dislodge such clogging particles or elements. For example, in one operation, controller 252 may output control signals causing pump 38 to pump at a frequency of between 1 kHz and 48 kHz. In one implementation, controller 252 may instead or additionally output control signals causing pump 250 to pump fluid in a reverse direction (indicated by arrow 254) during pumping by pump 38 to reduce the force at which the clogging particles are being held against the inlets of filter channels 40, 243, 245, 247, 249 or during times at which pumping by pump 38 is paused to more forcefully blowout or dislodge any clogged particles away from the inlets of filter channels 40, 243, 245, 247, 249.

In one implementation, system 220 may additionally comprise one or more flow sensors, such as the example flow sensor 256 (schematically shown). In such an implementation, the flow sensors detect fluid flow and based upon the detected fluid flow, controller 252 determines whether filter channels 40, 243, 245, 247, 249 are sufficiently clogged so as (A) to warrant a change in the frequency at which pump 38 pumps fluid, (B) to warrant more frequent reverse pumping by pump 250 and/or so as (C) to warrant a change in the rate or force at which pumps 28, 38 and/or 250 are driving fluid. For example, in one implementation, sensor 256 may detect the flow of fluid within channel 34 in the direction indicated by arrow 44. If the detected flow falls below a predetermined threshold, controller 252 may determine a clogging situation that warrants an automatic change by controller 252 such as increasing the force or the rate of pumping by pump 28, reducing the force or rate of pumping by pump 38, decreasing the frequency at which pump 38 is actuated and/or increasing the frequency at which pump 250 is actuated.

In some implementations, system 220 may instead or additionally comprise a flow sensor 258 located within channel 24 such as proximate to the downstream end of channel 24, or at a discharge of channel 24, wherein if the detected flow rises above a predetermined threshold, controller 252 may determine a clogging situation warranting an automatic change by controller 252 such as increasing the force a rate of pumping by pump 28, reducing the force or rate of pumping by pump 38, decreasing the frequency at which pump 38 is actuated and/or increase in the frequency at which pump 250 is actuated. In yet other implementations, flow sensors, such as sensor 260, maybe located within at least one of filter channels 40, 243, 245, 247, 249, wherein if the detected flow falls below a predetermined threshold, controller 252 may determine a clogging situation warranting an automatic change by controller 252 such as increasing the force a rate of pumping by pump 28, reducing the force or rate of pumping by pump 38, decreasing the frequency at which pump 38 is actuated and/or increasing the frequency at which pump 250 is actuated.

FIGS. 4-6 illustrate how the characteristics of multiple filter channels may be varied along the length of channels 24 and 34. FIG. 4 illustrates microfluidic filtering system 320. Filtering system 320 is similar to filtering system 220 except that filter channels 40, 243, 245, 247, 249 are replaced with filter channels 340, 342, 344 and 346, wherein the cross-sectional areas of the inlets of the different filter channels successively along channel 24 progressively get larger in the downstream direction (the direction of arrow 42) to provide progressive or stepwise filtering of the primary flow within channel 24. In the example illustrated, pumps 28 and 38 are specifically illustrated as drawing fluid in the direction indicated by arrows 42 and 44, respectively. In such implementations, pumps 28 and 38 may comprise ejection devices as described above. Those remaining components or elements of system 320 which correspond to components of system 220 are numbered similarly or are shown in FIG. 3. For example, system 320 additionally comprises pump 250, controller 252 and sensors 256, 258 and 260 which are shown in FIG. 3.

FIG. 5 illustrates microfluidic filtering system 420. System 420 is similar to system 320 except that system 420 comprises filter channels 440, 442, 444 and 446. Filter channels 440, 442, 444 and 446 extend between interconnect channels 24 and 34. Filter channels 440, 442, 444 and 446 have inlet cross-sectional areas successively along channel 24 that progressively get smaller in the downstream direction (the direction of arrow 42) to provide progressive or stepwise filtering of the primary flow within channel 24.

FIG. 6 schematically illustrates microfluidic filtering system 520. System 520 is similar to system 320 except that system 520 comprises filter channels 540, 542, 544 and 546. In the illustrated example, the angles formed by the intersecting centerlines of channel 24 and the various filter channels vary along the length of channel 24 so as to vary the force and rate at which filtered fluid is drawn through the filter channels amongst the different filtering channels. In the example illustrated, the angles of the intersecting centerlines of channel 24 and the various filter channels may successively or gradually become larger in the downstream direction (in the direction of arrow 42). For example, the most upstream filter channel 540 may have a smaller angle closer to 0°, wherein each successively downstream filter channel (channels 542, 544 and 546) may have an angle greater than that of the upstream preceding filter channel, approaching 90°. In other implementations, the angles of the intersecting centerlines of channel 24 and the various filter channels may successively or gradually become smaller in the downstream direction (in the direction of arrow 42). Although each of the filter channels of each of systems 320, 420 and 520 are illustrated as being linear channels oblique to each of channels 24 and 34, in other implementations, each of such filter channels may have alternative configurations such as those shown in FIG. 3.

FIGS. 7A-7E illustrate one example filtering and cleaning operation by an example microfluidic filtering system 620. System 620 is similar to system 220 described above except that system 620 comprises a series of parallel, uniformly spaced filter channels 243 extending between and interconnecting channel 24 and channel 34. Although not illustrated, system 620 comprises each of the remaining components or elements shown in FIG. 3.

Figure 7A:
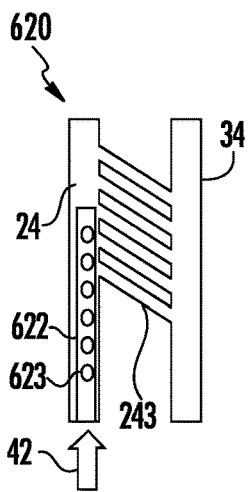
FIGS. 7A-7E are schematic diagrams of an example microfluidic filtering system during different stages of filtering.
Figure 7B:
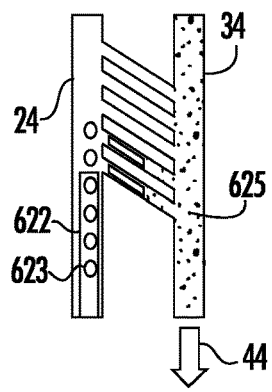

As illustrated by FIG. 7A, controller 252, following instructions contained in a non-transitory computer-readable medium, outputs control signals activating pump 28 to move a primary flow 622 of fluid containing particles 623 along channel 24 in the direction indicated by arrow 42 as part of a primary pump pulse. As illustrated by FIG. 7B, after the primary pump pulse has ended, controller 252 further outputs control signals causing pump 38 to move a secondary flow 625 of fluid long channel 34 in the direction indicated by arrow 44 as part of a secondary pump pulse. During the secondary pump pulse, portions of the sample in channel 24 or pulled into filter channels 243 to form the secondary flow 625. During such time, particles 623 or retained adjacent to the inlets of filter channels 243, potentially clogging filter channels 243.

Figure 7C:
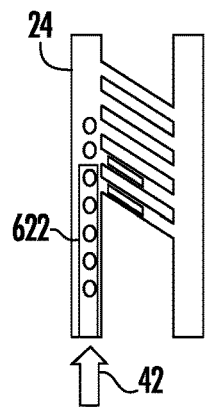
Figure 7D:
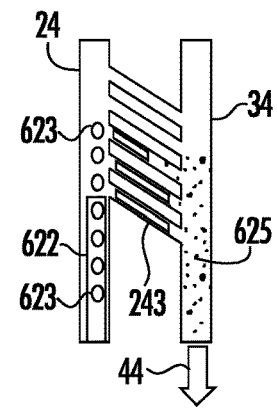

As illustrated by FIG. 7C, following completion of the secondary pump pulse, controller 252 once again outputs control signals causing pump 28 to execute a second primary pump pulse, moving a primary flow of the sample 622 further along channel 24 in the direction indicated by arrow 42. During the second primary pump pulse, the particles 623 that were previously lodged against the inlets of filter channels 243 become dislodged from the inlets or openings of channels 243, declogging filter channels 243. As illustrated by FIG. 7D, following completion of the second primary pump pulse, controller 252 once again outputs control signals causing pump 38 to execute a second secondary pump pulse, wherein additional volume of the sample within channel 24 is pulled across filter channels 243 into channel 34 and moved along channel 34 and the direction indicated by arrow 44. During such time, particles 623 may once again or new particles 623 may become lodged against the inlet openings of filter channels 243, potentially clogging the filtering channels 243, Once the second secondary pump pulse has been completed, controller 252 once again executes the previously described primary pump pulse. This cycle of alternating between a primary pump pulse and a secondary pump pulse is repeated by controller 252. During this cycle, filter channels 243 are repeatedly clogged and repeatedly opened or cleaned as the sample, initially supplied in channel 24, is filtered across filter channel 243 and discharged via channel 34.

Figure 7E:
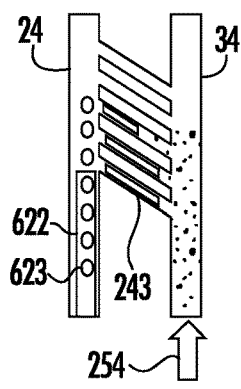

As illustrated by FIG. 7E, controller 252 may accelerate cleaning or declogging of filter channels 243 by outputting control signals causing pump 250 to pump fluid within channel 34 in the reverse direction as indicated by arrow 254. The reverse fluid flow moves through filter channels 243 and dislodges those particles 623 entrapped against the inlet or openings of filter channels 243 along channel 24. In one implementation, such reverse flow occurs while pump 28 is inactive. In yet another implementation, such reverse flow occurs while pump 28 is active, further assisting in moving such entrapped particles 623 away from the inlets of filter channels 243.

In one implementation, such enhanced cleaning is carried out by controller 252 on a periodic basis at predefined times or time intervals. In yet another implementation, such enhanced cleaning is carried out by controller 252 in response to signals from sensor 256, sensor 258 and/or sensor(s) 260. For example, in response to signals from any of such sensors 256, 258, 260, indicating sufficiently clogged number or clogged extent of filter channels 243, controller 252 may automatically pause the pumping by pump 38 and initiate pumping by pump 250. In some implementations, controller 252 may automatically initiate pumping by pump 28 as well. In some implementations, such pumping may continue for a predefined length of time. In other implementations, such pumping may continue until signals from at least one of sensors 256, 258, 260 indicate a resumption of flow above a predefined threshold, reflecting that a sufficient extent or number of filter channels 243 have been declogged. In some implementations, pump 250 may be omitted.

Figure 8:
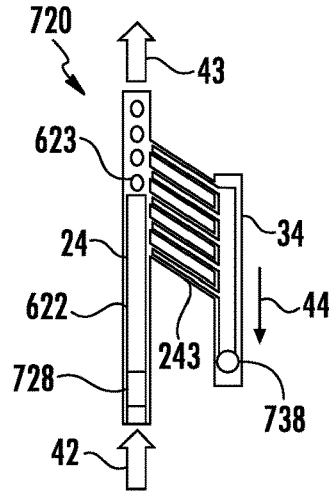
FIG. 8 is a schematic diagram of an example microfluidic filtering system.

FIG. 8 illustrates another example microfluidic filtering system 720. Filtering system 720 is similar to filtering system 620 except that filtering system 720 is specifically illustrated as comprising inertial push pump 728 and capillary ejection pull pump 738. Those remaining components or elements of system 720 which correspond to components of system 620 and system 220 are numbered similarly or are illustrated in FIG. 3.

Inertial push pump 728 pushes fluid, such as a received sample, along channel 24 and the direction indicated by arrow 42. Inertial push pump 728 comprises an inertial pump, wherein the pump 728, comprises a fluid actuator, asymmetrically located along the length of channel 24 and spaced from ends of channel 24 by different distances, such that pump 728 propagates oppositely directed waves and produces a unidirectional net fluid flow in the direction indicated by arrow 42. Examples of the fluid actuator forming pump 728 include, but are not limited to, a piezoelectric membrane, a thermal bubble resistor fluid actuator, and electrostatic micro-electro-mechanical system (MEMS) membrane fluid actuator, a mechanical/impact driven membrane actuator, an electro-chemical bubble generator, a voice coil fluid actuator, and a magnetostrictive drive fluid actuator.

Pump 738 comprises a fluid ejector, comprising a fluid actuator, such as those described above with respect to pump 728, and a discharge port or nozzle through which fluid is ejected by the fluid actuator of pump 738. Examples of such a fluid ejector include, but are not limited to, a bubble jet resistor that ejects fluid through a nozzle. With a fluid ejector, fluid is ejected from channel 34 to create capillary pressure that draws fluid in the direction indicated by arrow 44. The discharge of fluid through the discharge port draws or pulls fluid within channel 24 across filter channels 243 into channel 34, Particles 623, which are prevented from flowing through filter channels 243, are driven along channel 24 and to a receiving channel receiving reservoir as indicated by arrow 43.

Figure 9:
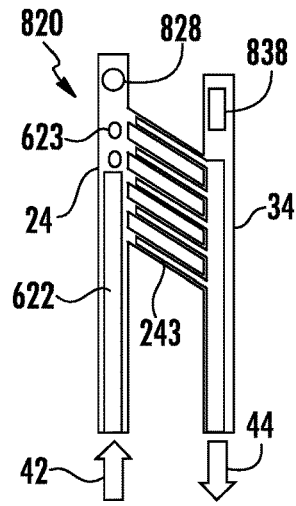
FIG. 9 is a schematic diagram of an example microfluidic filtering system.

FIG. 9 schematically illustrates an example microfluidic filtering system 820. System 820 is similar to system 720 except that system 820 is specifically illustrated as comprising capillary ejection pull pump 828 and inertial push pump 838 in place of pump 728 and 738. Those remaining components or elements of system 820 which correspond to components or elements of system 720 are numbered similarly and/or are shown in FIGS. 3 and 8.

Capillary ejection pull pump 828 is similar to pump 738 except that pump 828 is located within channel 24 so as to draw fluid, such as a received sample, in the direction indicated by arrow 42 along and across the inlet openings of filter channels 243. Inertial push pump 838 is similar to push pump 728 described above except that pump 838 is located within channel 34 so as to push fluid in the direction indicated by arrow 44. As a result, filtered fluid from channel 24 flows through filter channels 243 and into channel 34, and is moved further along by pump 838. At the same time, particles 623 within the primary flow 622 within channel 24 are discharged through the discharge nozzle or opening of pump 828 by the fluid ejector pump 828.

Figure 10:
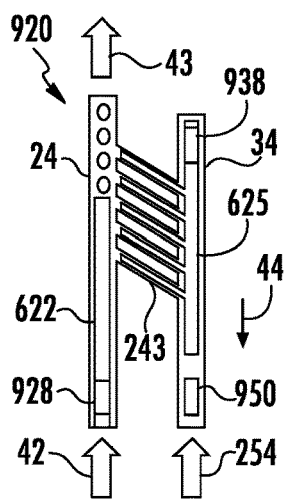

FIG. 10 schematically illustrates an example microfluidic filtering system 920. System 920 is similar to systems 220 and 620 except that filtering system 920 is specifically illustrated as comprising inertial push pump 928, inertial push pump 938 and inertial push pump 950. Those remaining components or elements of system 920 which correspond to components of system 620 and system 220 are numbered similarly or are illustrated in FIG. 3.

Inertial push pump 928 is similar to push pump 728 described above. Inertial push pump 938 is similar to inertial push pump 838 described above. Inertial push pump 950 is similar to push pump 728 or push pump 838 except that pump 950 function similar to pump 250 described above. In operation, push pump 928 draws fluid from a sample source and moves the primary flow 622 of fluid in the direction indicated by arrow 42 along channel 24. Push pump 938 is a secondary flow 625 of fluid along channel 34 in the direction indicated by arrow 44 to draw the fluid of primary flow 622 across fluid filters 243 into channel 34 for being driven by pump 938. When enhanced declogging or cleaning is to be carried out, pump 938 is paused and controller 252 activates pump 950 to move fluid in a reversed direction as indicated by arrow 254, driving fluid along channel 34, across filter channels 243 and into channel 24 to dislodge any in clogged or entrapped particle 623.

FIG. 11 schematically illustrates an example microfluidic filtering system 1020. Filtering system 1020 is similar to filtering system 220 and filtering system 820 except that system 1020 additionally serves as a sorter, additionally comprising microfluidic channel 1034, pump 1038, filter channels 1243 and reverse flow pump 1250. Those remaining components or elements of system 1020 which correspond to components or elements of system 820 are numbered similarly or are shown in FIG. 3. For example, although not specifically illustrated in FIG. 11, system 1020 additionally comprises controller 252 and sensors 256, 258 and 260.

Microfluidic channel 1034 is similar to microfluidic channel 34 in that channel 1034 provides a counter flow to the primary flow 622 within channel 24, wherein the counter flow draws particles against filter channels 1243 and carries away the filtered fluid that passes through filter channels 1243. Pump 1038 comprises an inertial push pump to move a tertiary flow of fluid along microfluidic channel 1034 in the direction indicated by arrow 1044 so as to draw or pull particles 1023 into and across fluid filters 1243.

Filter channels 1243 are similar to filter channels 243 except that filter channels 1243 extend between interconnect channel 24 and channel 1034. Filter channels 1243 have a cross-sectional area and/or are shaped differently than that of filter channels 243. Filter channels 1243 are sized and/or are shaped to receive and pass particles 1023 (whether chemical, biological or the like) that cannot pass through filter channels 243. At the same time, filter channels 1243 are sized and/or are shaped to block or inhibit the flow or passage of particles 623. As a result, system 1020 may serve as a sorter, withdrawing particles 1023 through filter channels 1243 and microfluidic channel 1034, withdrawing particles 623 through the discharge port of pump 828 and withdrawing a remainder of the filtered fluid through filter channels 243 and microfluidic channel 34. In some implementations, it should be appreciated that pump 828 may comprise an inertial pump, similar to pump 728 described above, Likewise, each of the inertial pumps 838 and 1038 comprises a capillary ejection pull pump, similar to pump 738 described above.

Reverse flow pump 1250 is similar to pump 950 described above except that pump 1250 is located within microfluidic channel 1034. Reverse flow pump 1250 function similar to pump 950 in that pump 1250 may be activated, when pump 1038 is inactive, to reverse the flow to dislodge or declog any particles within channel 24 that may be blocking or occluding the inlet or passages of fluid filters 1243.

In the example illustrated, system 1020 may additionally comprise flow sensors 1256, 1258 and/or 1260 to output signals to controller 252 (shown in FIG. 3) indicating clogging of filter channels 1243. As with signals from sensor to 256, 258 and 260, controller 252 may determine a clogging situation warranting an automatic change by controller 252 such as increasing the force a rate of pumping by pump 828, reducing the force or rate of pumping by pump 1038, decreasing the frequency at which pump 1038 is actuated and/or increase the frequency at which a reversal pump 1250 is actuated and/or the driving force of pump 1250.

FIG. 12 schematically illustrates an example microfluidic filtering system 1120. Filtering system 1120 is similar to system 1020 except that system 1120 sorts differently sized particles in the sample of the primary flow 622 in a successive or staged manner, wherein fluid containing no particles and fluid containing smaller particles are first filtered and wherein the fluid contained no particles and the smaller particles are then filtered once again to separate the small particles from the remaining fluid, System 1120 is similar to system 1020 except that filter channels system 1120 comprises filter channels 1143 instead of channels 243 and that pump 838 moves fluid along channel 34 in a direction indicated by arrow 1144, the same direction as the fluid moving within channel 24. Those remaining components or elements of system 1120 which correspond to components of system 1020 are numbered similarly or are shown in FIG. 3. Although pump 838 is illustrated as an inertial push pump, in other implementations, pump 838 may comprise a fluid ejector, similar to inertial pull pump 738 described above.

Filter channels 1143 are sized similar to filter channels 243 described above. However, filter channels 1143 extend between interconnect microfluidic channel 1034 and microfluidic channel 34. Filter channels 1143 are further oriented so as have centerlines that intersect the centerline of microfluidic channel 1034 to form an angle A3 that is nonparallel to the centerline of channel 1034 and that is 90° or less facing in the direction of arrow 1144, the upstream direction of fluid flow within channel 1034 or the downstream direction of fluid flow within channel 34.

In some implementations, channel 34 may additionally comprise a reverse pump 950 for accelerated the clogging of filter channels 1143. As described above respect to system 1020, system 1120 may additionally comprise flow sensors that detect clogging conditions of filter channels 1243 or 1143, wherein controller 252 may determine a clogging situation (by comparing flow signals to predetermined thresholds) warranting an automatic change by controller 252. For example, in response to determining clogging of filter channels 1243, controller 252 may increase the force a rate of pumping by pump 828, reducing the force or rate of pumping by pump 1038, decreasing the frequency at which pump 1038 is actuated. In response to determining clogging of filter 1143, controller 252 may increase the force a rate of pumping by pump 1038, reducing the force or rate of pumping by pump 950, decreasing the frequency at which pump 950 is actuated and/or increase the frequency at which a reversal pump 950 is actuated and/or the driving force of pump 950.

FIG. 13 schematically illustrates an example microfluidic filtering system 1220. System 1220 is similar to system 1020 except that microfluidic channel 34 and filter channels 243 are located on an opposite side of channel 24 as compared to microfluidic channel 1034 and filter channels 1243. Those remaining components or elements of system 1220 which correspond to components of system 120 or system 220 are numbered similarly or shown in FIG. 3. System 1220 operates in a similar fashion as that of system 1020.

FIG. 14 schematically illustrates an example microfluidic filtering system 1320. System 1320 comprises a parallel microfluidic filtering systems 720A, 720B, 720C and 720D (collectively referred to as systems 720) arranged between an input reservoir 1322 and an output reservoir 1326. Each of filtering systems 720 is described above with respect to FIG. 8. With each of filtering systems 720, pump 728 draws fluid, such as a raw sample, from input reservoir 1322 and moves the drawn fluid along channel 24 past filter channels 243.

As described above with respect to filtering system 720, pump 738 of each of filtering system 720 pulls portions of the raw sample flowing through channel 24 (portions without particles 623) through and across filter channels 243 into channel 34. The filtered sample (portions without particle 623) is ejected or expelled through the nozzle or other discharge port of pump 738. The remaining particles 623 in channel 24 are ultimately delivered to output reservoir 1326, Each of filtering system 720 operates in parallel to more quickly perform such filtering operations in a reduced area, such as a reduced area on a microfluidic chip.

In some implementations, system 1320 may comprise other microfluidic filtering systems arranged in parallel between reservoir 1322 and 1326. For example, in other implementations, system 1320 may comprise any of the individual filtering systems described above. In one implementation, system 1320 may comprise any of the above individual filtering systems, the individual filtering systems arranged in parallel each specifically including the above described reverse flow pump 250, any of the above described different filter channels, controller 252 and/or any of the above described flow sensors which trigger action by controller 252.

FIG. 15 schematically illustrates an example microfluidic filtering system 1420. System 1420 is similar to system 1320 except that system 1420 recirculates the fluid containing large particles 623 back to input reservoir 1322, which also serves as an output reservoir so as to continuously purify the fluid within reservoir 1322. As shown by FIG. 15, system 1420 comprises multiple individual filtering systems 1422A, 1422B (collectively referred to as filtering systems 1422). Each of the individual filtering systems 1422 is similar to filtering system 720 described above with respect to FIG. 8 except that microfluidic channel 24 is replaced with microfluidic channel 1424. Microfluidic channel 1424 has an input end 1423 connected to reservoir 1322 and an output end 1425 connected to reservoir 1322. In the example illustrated, channel 1424 is U-shaped. In other implementations, channel 1424 may have other shapes, wherein both of the input end and the output end are connected to reservoir 1322.

In some implementations, system 1420 may comprise other individual microfluidic filtering systems arranged in parallel along reservoir 1322. For example, in other implementations, system 1420 may comprise any of the individual filtering systems described above, but where the output and of the above-described channels 24 are rerouted back to and connected to the same reservoir which supplies fluid to the input and of channel 24. In one implementation, system 1420 may comprise any of the above individual filtering systems modified such that the channel 24 discharges fluid back to the reservoir from which channel 24 draws fluid, wherein the individual filtering systems arranged in parallel may comprise the above described reverse flow pump 250, any of the above described different filter channels, controller 252 and/or any of the above described flow sensors which trigger action by controller 252.

FIG. 16 schematically illustrates an example microfluidic filtering system 1520. System 1520 comprises a parallel microfluidic filtering systems 1522A and 1522B (collectively referred to as systems 1522) arranged along a reservoir 1322 that serves as both a fluid input and a fluid output for each of the individual filtering systems 1522. Each of filtering systems 1522 is similar to the above-described filtering system 820 except that in system 1520, each of the individual filtering system 1522 has both channels 24 and 34 fluidly connected to the same reservoir 1322. As a result, while the larger particles 623 are discharged from each of the channels 24 through the nozzle or outlet opening of pump 828, the filtered fluid is discharged from channel 34 back into reservoir 1322, such that the fluid contained within reservoir 1322 is repeatedly recycled and re-filtered for enhanced purification.

In one implementation, system 1520 may have multiple different individual microfluidic filtering systems along reservoir 1322, wherein each of the different individual microfluidic filtering systems is configured to filter out differently sized particles from the fluid in reservoir 1322. For example, in one implementation, filtering system 1522B may have filter channels 243 which have differently sized cross-sectional areas and/or shapes to filter out different particles as compared to the particles being filtered out by filter channels 243 of filtering system 1522A.

In some implementations, the individual microfluidic filtering systems 1522 having different particle filtering properties may be selectively activated by controller 252 to vary the degree to which the fluid within reservoir 1322 is filtered. For example, controller 252 may receive input through an input device that selects what sized particles are to be removed from the sample fluid in reservoir 1322. Based upon such input, controller 252 may activate selected ones of the different individual filtering systems 1522 along reservoir 1322 is the filter out those sized particles selected by the user. If the user desires to filter out first particles too large to pass through filter channels 243 of system 1522A, but keep second particles too large to pass through filter channels 243 of system 1522B, controller 252 may leave system 1522B in an inactive state while activating system 1522A. If a user desires to filter out both the first particles and the second particles, controller 252 may output control signals activating both of systems 1522A and 1522B.

Although illustrated as including individual filtering systems 1522 that are similar to filtering system 820 described above, other implementations, system 1520 may comprise other individual microfluidic filtering systems arranged in parallel along reservoir 1322. For example, in other implementations, system 1420 may comprise any of the individual filtering systems described above. In system 1520, each of the individual filtering systems arranged in parallel may additionally comprise the above described reverse flow pump 250, any of the above described different filter channels, controller 252 and/or any of the above described flow sensors which trigger action by controller 252.

FIGS. 17A and 17B schematically illustrate an example microfluidic filtering system 1620. System 1620 is similar to system 220 and system 820 described above except that system 1620 additionally comprises channel cleaners 1660. Those remaining components or elements of system 1620 which correspond to elements of system 820 are numbered similarly or shown in FIG. 3. In particular, although not illustrated, system 1620 additionally comprises reverse flow pump 250, controller 252 and flow sensors 256, 258 and 260 shown in FIG. 3.

Channel cleaners 1660 comprise fluid actuators located within each of filter channels 243. Channel cleaners 1660 actuate or impose a force to fluid within their respective channels so as to drive any clogging particle or particles 623 away from the inlet or mouth of the respective channel 243. In one implementation, each of such channel cleaners 1660 is concurrently actuated by controller 252 on a periodic basis or in response to receiving signals from at least one of the flow sensors indicating a channel clogging. In another implementation, each of such channel cleaners 1660 may be actuated independent of the other of channel cleaners 1660, facilitating continued filtering by those filter channels 243 that are not presently clogged or occluded. For example, in one implementation, each of such channels 243 may include flow sensor 1260, wherein controller 252 may determine which of the filter channel 243 are presently clogged or occluded and may then output control signals activating just those channel cleaners 1660 associated with the clogged channels 243.

In one implementation, each of channel cleaners 1660 comprises a cleaning resistor. In such an implementation, controller 252 activates the individual channel cleaners by supplying electrical current across such resistors such that heat is generated to vaporize the fluid within the respective channel 243 and create a bubble 1625 which pushes or expels the clogging particle 643 away from the inlet of the respective channel 243 as illustrated in FIG. 17B. In yet other implementations, each of the individual channel cleaners may comprise other forms of fluid actuators such as a piezoelectric membrane, an electrostatic micro-electro-mechanical system (MEMS) membrane, a mechanical/impact driven membrane, an electrochemical bubble generator, a voice coil fluid actuator, a magnetostrictive or piezoelectric drive fluid actuator. In some implementations, some of channel 243 may omit channel cleaners 1660.

FIG. 18 schematically illustrates an example microfluidic filtering system 1720. System 1720 uses a sequential series of counter flows to filter and fraction particles by size, different nature and/or different chemistry in a multistage manner using multiple recirculating loops. System 1720 comprises reservoirs 1722A, 1722B, 1722C (collectively referred to as reservoirs 1722), microfluidic channels 1724A, 1724B, 1724C (collectively referred to as channels 1724), pumps 1728A, 1728B, 1728C (collectively referred to as pumps 1728), filter channels 1743A and 1743B (collectively referred to as channels 1743), reverse pumps 950A, 950B (collectively referred to as reverse pumps 950) (described above), channel cleaners 1660, controller 1752, flow sensors 1760A, 1760B (collectively referred to as sensors 1760) and concentration sensors 1762B and 1762C (collectively referred to as sensors 1762). Although illustrated as comprising two filtering stages provided by the successive filter channels 1743A and 1743B, in other implementations, system 1720 may include greater than two of such filtering stages.

Reservoirs 1722 each supply fluid to and receive fluid from their respective microfluidic channels 1724 as the fluid in each of reservoir 1722 is being continuously filtered and made purer in its designated content. Reservoir 1722A contains the rawest of the sample fluid, fluid containing each of particles 623, particles 1023 and finer fluid 1723. Reservoir 1722B contains fluid that is been filtered by filter channels 1743A to separate out particles 1023 and finer fluid 1723 from the base or raw fluid within reservoir 1722A, Reservoir 1722C contains fluid that is been filtered by filter channels 1743B to separate out the finer fluid 1723 from particles 1023 within reservoir 1722A. Continued filtering by system 720 increases the concentration of particles 623 in the fluid within reservoir 1722A, increases the concentration of particles 1023 within reservoir 1722B and increases the concentration of the finer fluid 1723 (fluid without particles or with particles smaller than particles 1023) in reservoir 1722C.

Channels 1724 each have an inlet or input end 1747 and a discharge or output end 1749, both of which are connected to the same respective reservoir. Pumps 1728A, 1728B and 1728C move fluid through channels 1724A, 1724B and 1724C, respectively, to recirculate fluid across the respective channels. In one implementation, pumps 1728 comprise inertial pumps proximate the inlet end 1747 of each channel to push fluid along and through each of the respective channels. In another implementation, pump 1728 may comprise fluid injectors proximate to outlet ends 1749, such as fluid actuators that eject fluid through discharge openings or nozzles, so as to pull or draw fluid along through each of the respective channels.

Filter channels 1743A comprise a first set of filter channels extending between and interconnecting channels 1724A and 1724B. Filter channels 1743A each have a first cross-sectional area and/or shape so as to allow the passage of particles 1023 and finer fluid 1723 (which may be smaller in size then particles 623) while blocking the passage of particles 623. Filter channels 1743B comprise a first set of filter channels extending between and interconnecting channels 1724B and 1724C, Filter channels 1743B each have a first cross-sectional area and/or shape so as to allow the passage of finer fluid 1723 (which omits particles or which contains particles smaller than particles 1023) while blocking the passage of particles 1023.

Reverse pumps 950 are described above. Reverse pumps 950, when activated, drive fluid within their respective channels in a reverse direction to further facilitate the declogging of filter channels 1743A and 1743B, respectively. Reverse pumps 950 may be activated on a predetermined periodic basis by controller 252 or in response to signals from flow sensors 1760 indicating clogging of the associated one of filter channels 1743.

Channel cleaners 1660 are disposed within each of filter channels 1743A and 1743B. Channel cleaners 1660 are illustrated and described above with respect to system 1620. Channel cleaners 1660, when activated by controller 1752 forcefully dislodge any particles that may be occluding or clogging the channel in which the particular channel cleaners 1660 is located.

Controller 1752 is similar to controller 252 described above. Controller 1752 outputs control signals that activate pumps 1728 and that may further activate reverse pumps 950 and/or channel cleaners 1660. In one implementation, controller 1752 outputs control signals causing the pumping action or operation of each of pumps 1728 to be intermittent or pulsed, facilitating back and forth motion of any particular elements occluding or clogging the filter channels to potentially dislodge such clogging particles or elements. In one implementation, controller 1752 causes pump 1726B to be activated or pumping at times when each of pumps 1728A and 1728C are in active or are paused.

Controller 1752 further receive signals from flow sensors 1760 and compares such signals to predetermined thresholds to determine which, if any, of the filter channels may be clogged or experiencing clogging. Flow sensors 1760 detect the flow rate within each of the individual filter channels 1743. Controller 1752 compares the flow rate signals from the flow sensors 1760 against a predefined stored threshold to determine the flow of fluid is sufficiently low indicate that an individual filter channel 1743 may be experiencing clogging.

In response to a determination that at least one of such filter channels 1743A may be clogged, controller 1752 may increase the force or rate of pumping by pump 1728A, may reduce the force or rate of pumping by pump 1728B, and/or may decrease the frequency at which pump 1728B is actuated to declog filter channels 1743A. In response to a determination that at least one of such filter channels 1743B may be clogged, controller 1752 may increase the force or rate of pumping by pump 1728B, may reduce the force or rate of pumping by pump 1728C, and/or may decrease the frequency at which pump 1728C is actuated to declog filter channels 1743B.

In yet other implementations, in circumstances where the number of filter channels 1743A experiencing clogging is less than a predefined threshold value, controller 1752 may output control signals activating those individual channel cleaners 1660 associated with the particular filters that are experiencing clogging. Likewise, in circumstances where the number of filter channels 1743B experiencing clogging is less than a predefined threshold value, controller 1752 may output control signals activating those individual channel cleaners 1660 associated with the particular filters that are experiencing clogging. On the other hand, in circumstances where the number of filter channels1743A experiencing clogging is greater than a predefined threshold, such as a large majority of such filters on are going clogging, controller 1752 may initiate more system-wide cleaning such as by outputting control signals activating reversed pump 950B and/or activating each of the channel cleaners 1660. In circumstances where the number of filter channels 1743B experiencing clogging is greater than a predefined threshold, such as a large majority of such filters on are going clogging, controller 1752 may initiate more system-wide cleaning such as by outputting control signals activating reverse pump 950C and/or activating each of the channel cleaners 1660 of filter channels 1743B.

Concentration sensors 1762 detect the concentration of particles or different groups of particles within their respective reservoirs 1722 and/or the purity of the fluid within each of reservoirs 1722, Concentration sensors 1762 outputs signals to controller 1752. Controller 1752 controls the operation of pumps 1728 based upon such signals from concentration sensors 1762. For example, a user may input a request for a particular level of purity or particular concentration range for a particular particle or composition in reservoir 1722B or reservoir 1722C. Controller 1752 may operate pumps 1726 until such concentration or purity requests are satisfied in the respective reservoirs. In some implementations, the user may input a request for a certain quantity or volume of fluid or a particular count of particles within reservoirs 1722B and 1722C. In such implementations, sensors 1762 may instead or additionally identify the number of particles or the volume of fluid containing the particles. The duration of filtering by controller 1752 may be additionally based upon such input volume/quantity requests.

FIG. 19 illustrates an example microfluidic filtering system 1820. System 1820 is similar to system 1420 described above except that system 1820 is illustrated as having series of individual filtering systems 1822 on both sides of a central reservoir or fluid supply slot 1322 and that each system 1822 comprises a column or post 1825 at the junction of microfluidic channel 1423 and channel 34 to form or define two filtering channels 1843. Those remaining components of system 1820 which correspond to components of system 1420 are numbered similarly. FIG. 19 specific illustrates pump 738 as comprising a nozzle or discharge opening 1871 and a fluid actuator 1872 which ejects fluid through the discharge opening 1871 draw fluid from microfluidic channel 1424 across filter channels 1843 into channel 34. Although not illustrated in FIG. 19, system 1820 additionally comprises controller 252 and flow sensors 256, 258 and 260 as described above and illustrated in FIG. 3.

FIG. 20 illustrates an example microfluidic filtering system 1920 system 1920 is similar to system 1820 described above except that system 1920 comprises individual filtering systems 1922 located in parallel on opposite sides of reservoir or fluid supply 1322. Systems 1922 are similar to systems 1822 described above except that systems 1922 each comprise microfluidic channel 1934, pumps 1938 and multiple columns or posts 1925 at the juncture of channel 1424 and channel 1934 that form or define multiple filter channels 1943. Systems 1920 may provide three-way separation between small, medium and large particles. Those remaining components of system 1920 which correspond to components of system 1820 are numbered similarly. Although not illustrated in FIG. 20, system 1820 may additionally comprise controller 252 and flow sensors 256, 258 and 260 as described above and illustrated in FIG. 3.

Microfluidic channel 1934 extends from filter channels 1943 and comprises a main chamber 1980, chambers 1982 and filter elements 1984. Main chamber 1980 extends between filter channels 1943 and stalls or fluid chambers 1982. Chambers 1982 each contain one of pumps 1938. Each pump 1938 comprises a fluid actuator 1872 that ejects fluid through a nozzle or discharge port 1871 to draw fluid into the respective stall 1982 from channel 1924, across filtering channels 1943 and across main body 1980 of channel 1934. Filter elements 1984 comprise structures, such as posts, columns the like extending in front of each of chambers 1982 at predetermined spacings. Filter elements 1984 have spacings so as to further block particles that are sized larger than such spacings to provide further filtering of the fluid prior to the fluid entering chambers 1982 and being discharged by pumps 1938. In some implementations, controller 252 (shown in FIG. 3) may selectively activate the individual pumps 1938, independent of one another to change the rate at which fluid is being drawn into channel 1934 from channel 1424 in response to signals from flow sensors 256, 258 and 260 that indicate that clogging of filter channels 1943 may be occurring. In some implementations, controller 252 may alternately activate pumps 1938 in chambers 1982 to potentially reduce particle clogging at filter elements 1984.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A microfluidic filtering system comprising:
   a first microfluidic channel;
   a first pump to move fluid along the first microfluidic channel in a first direction;
   a second microfluidic channel;
   a second pump to move fluid along the second microfluidic channel in a second direction opposite to the first direction; and
   a filter channel extending between and interconnecting the first microfluidic channel and the second microfluidic channel;
   wherein the filter channel forms a first obtuse angle with the first microfluidic channel in the first direction, the first obtuse angle configured to reduce clogging or occlusion of the filter channel by particles not passing through the filter channel, and wherein the filter channel forms a second obtuse angle with the second microfluidic channel in the second direction, the second obtuse angle configured to reduce clogging or occlusion of the filter channel by particles not passing through the filter channel.

2. The microfluidic filtering system of claim 1 further comprising a third pump to move fluid along the second microfluidic channel in the first direction.

3. The microfluidic filtering system of claim 1 further comprising:
   a third microfluidic channel;
   a second filter channel extending between and interconnecting the third microfluidic channel and the second microfluidic channel; and
   a third pump to move fluid along the second microfluidic channel in the second direction.

4. The microfluidic filtering system of claim 1 further comprising:
   a third microfluidic channel;
   a second filter channel extending between and interconnecting the second microfluidic channel and the third microfluidic channel; and
   a third pump to move fluid along the third microfluidic channel in the first direction.

5. The microfluidic filtering system of claim 4 further comprising:
   an input reservoir, wherein the first microfluidic channel has an inlet and an outlet connected to the input reservoir;

a first output reservoir, wherein the second microfluidic channel has an inlet and an outlet connected to the first output reservoir; and a second output reservoir, wherein the third microfluidic channel has an inlet and an outlet connected to the second output reservoir.

6. The microfluidic filtering system of claim 1 further comprising:
a third microfluidic channel;
a second filter channel extending between and interconnecting the first microfluidic channel and the third microfluidic channel; and
a third pump to move fluid along the third microfluidic channel in the second direction.

7. The microfluidic filtering system of claim 1, wherein the first microfluidic channel has a cross-sectional area of at least twice and no greater than ten times a maximum dimension of particles to be moved through the first microfluidic channel.

8. The microfluidic filtering system of claim 1 further comprising:
a fluid reservoir, wherein the first microfluidic channel has an inlet and an outlet connected to the fluid reservoir, wherein the second pump comprises:
a nozzle opening; and
a fluid ejector to eject fluid through the nozzle opening to discharge fluid from the second microfluidic channel.

9. The microfluidic filtering system of claim 8 comprising:
a first fluid chamber in the second microfluidic channel, wherein the second pump comprises:
a first nozzle opening within the first fluid chamber; and
a first fluid ejector within the first fluid chamber to eject fluid through the first nozzle opening;
a second fluid chamber in the second microfluidic channel;
a third pump to move fluid along the second microfluidic channel in the second direction, the third pump comprising:
a second nozzle opening in the second fluid chamber; and
a second fluid ejector within the second fluid chamber to eject fluid through the second nozzle opening;
a first filter to filter first sized particles entering the first fluid chamber; and
a second filter to filter second sized particles, different than the first sized particles, entering the second fluid chamber.

10. The microfluidic filtering system of claim 1 further comprising:
a fluid reservoir, wherein the first pump moves fluid from the fluid reservoir into the first microfluidic channel and comprises:
a nozzle opening; and
a fluid ejector to eject fluid through the nozzle opening to discharge fluid from the first microfluidic channel; and
wherein the second pump comprises an inertial pump to move fluid from the second microfluidic channel into the fluid reservoir.

11. The microfluidic filtering system of claim 1 further comprising an inertial pump within the filter channel.

12. The microfluidic filtering system of claim 1 further comprising:
an input reservoir, wherein the first microfluidic channel has an inlet and an outlet connected to the input reservoir; and
an output reservoir, wherein the second microfluidic channel has an inlet and an outlet connected to the outlet reservoir.

13. A method comprising:
directing a primary flow along a first microfluidic channel in a first direction; and
directing a secondary flow along a second microfluidic channel and a second direction opposite the first direction to draw a large particle within the first microfluidic channel against a filtering channel extending between and interconnecting the first microfluidic channel and the second microfluidic channel;
wherein the filtering channel forms a first obtuse angle with the first microfluidic channel in the first direction, the first obtuse angle selected to reduce clogging or occlusion of the filtering channel by the large particle within the first microfluidic channel, and wherein the filtering channel forms a second obtuse angle with the second microfluidic channel in the second direction.

14. An apparatus comprising:
a fluid reservoir;
a first microfluidic channel having an inlet and an outlet connected to the fluid reservoir;
an inertial bubble jet pump to move fluid from the fluid reservoir though the inlet, along the first microfluidic channel in a first direction, and out the outlet to the fluid reservoir;
a second microfluidic channel;
a filter channel extending between and interconnecting the first microfluidic channel and the second microfluidic channel;
a nozzle opening in the second microfluidic channel; and
a bubble jet resistor to eject fluid through the nozzle opening during expansion of the formed bubble and to draw fluid into the second microfluidic channel through the filter channel from the first microfluidic channel;
wherein the filter channel forms a first obtuse angle with the first microfluidic channel in the first direction, the first obtuse angle configured to reduce clogging or occlusion of the filter channel by particles not passing through the filter channel.

* * * * *